United States Patent [19]

Mölter et al.

[11] 3,944,087
[45] Mar. 16, 1976

[54] ON-BOARD FREIGHT LOADING DEVICE FOR AIRCRAFTS

[75] Inventors: Gunther Mölter, Ottobrunn; Christoph Schubert, Zorneding, both of Germany

[73] Assignee: Messerschmitt-Bolkow-Blohm GmbH, Munich, Germany

[22] Filed: Aug. 9, 1974

[21] Appl. No.: 496,152

[30] Foreign Application Priority Data

Aug. 14, 1973 Germany............................ 2341057

[52] U.S. Cl................ 214/75 R; 14/71 A; 187/9 R; 214/75 T
[51] Int. Cl.² ............................................ B60F 1/46
[58] Field of Search ........ 214/85, 75 R, 75 H, 75 T, 214/95 A, 109, 104; 14/71 R, 71 A, 72; 296/61; 187/2, 9 R, 95

[56] References Cited
UNITED STATES PATENTS

| | | | |
|---|---|---|---|
| 2,088,122 | 7/1937 | Taylor.............................. | 214/75 H |
| 3,006,486 | 10/1961 | Cook et al. ....................... | 214/75 H |
| 3,478,904 | 11/1969 | Courter............................. | 214/75 R |

Primary Examiner—Robert J. Spar
Assistant Examiner—Lawrence J. Oresky
Attorney, Agent, or Firm—Woodhams, Blanchard and Flynn

[57] ABSTRACT

An on-board freight loading device for aircrafts, particularly for large aircrafts, which transport large containers for containerized freight. The freight loading device has a lifting platform for receiving the freight, which lifting platform can be lifted approximately from the ground level to the level of the floor of the freight compartment of the aircraft. The platform is movable in a frame, which can be swung between a storage position within the aircraft fuselage and an approximately vertical operating position outside of the aircraft. The frame for the lifting platform consists of two beams which are parallel to one another, when in the operating position, and which beams in their upper zone are hinged to the aircraft by further hinged joints. The central axes of the hinged joints lie approximately parallel to the y-axis of the aircraft so that the beams can be folded from the operating position first into a position parallel to the x-axis against one another prior to their being swung into the storage position inside the aircraft.

6 Claims, 2 Drawing Figures

ON-BOARD FREIGHT LOADING DEVICE FOR AIRCRAFTS

FIELD OF THE INVENTION

The invention relates to an on-board freight loading device for aircrafts, particularly for large aircrafts, wherein the term "freight" particularly means large containers for containerized freight.

BACKGROUND OF THE INVENTION

Competent loading and unloading devices are known in many forms. The devices which belong to the state of the art consist generally of a lifting platform which is moved in the desired manner by suitable means. Thus it is known, for example from the German Offenlegungsschrift No. 2 052 192, to provide a guide frame from the lifting platform which is swingable from an approximately horizontal stored position which is parallel to the y-axis within the fuselage into an approximately vertical operating position outside of the fuselage. A further freight loading device for aircrafts is, for example, known from U.S. Pat. No. 3 478 904. In this device the guide frame for the lifting platform is hinged at its upper end on the aircraft and, furthermore, is provided with joints so that it can be brought after a one time or several times folding from the operating position into the rest position into the aircraft.

All known competent solutions have the disadvantage that the loading devices in their rest position take up too much space inside the aircraft. As a result, not enough space remains for a complete container of average size.

The invention is based on an on-board freight loading device for aircrafts, particularly for large aircrafts, which transport large containers for containerized freight, having a lifting platform for receiving the freight, which lifting platform can be lifted approximately from ground height to the height of the floor of the freight compartment in the aircraft. The platform is movable in a frame which is swingable between a storage position within the aircraft fuselage and an approximately vertical operating position outside of the aircraft.

The basic purpose of the invention is to construct or develop such a freight loading device in a manner that it takes up in its stored position in the aircraft as small a space as possible and without reducing other desirable characteristics.

This purpose is attained substantially in such a manner that the frame for the lifting platform consists of two beams which, when in the operating position, are parallel to one another and which have in their upper zone each a hinged joint hingedly connecting the beams to the aircraft. The central axes of the hinged joints, when in the operating position of the beams, lie in a plane parallel to the y-axis of the aircraft, so that the beams can be folded from the operating position first into a position parallel to the x-axis of the aircraft against one another prior to their being swung into the storage position inside the aircraft. It is to be understood that the x-axis of the aircraft extends parallel to the longitudinal axis of the aircraft and the y-axis extends perpendicular to the x-axis and in the direction of the wings of the aircraft.

This solution has the decisive advantage that in the case of the subject matter of the invention, the required space for the stored position compared with the known versions of corresponding freight loading devices is considerably reduced. The frame of the inventive loading device can now be stored substantially in a space which is at any rate dead space due to the geometric cross sectional relationships between an approximately round aircraft fuselage and rectangular shaped loading goods in the form of large containers.

A further structural advantage of the subject matter of the invention can be seen in that the hinged joints for the beams which, when in the operating position, are arranged staggered against one another in z-direction. This has namely the consequence that the beams in the stored position come to rest in a parallel side-by-side relation which additionally serves to conserve space.

Furthermore, it may be advantageous if the lifting platform has an intermediate joint. Also this measure contributes, in the scope of the invention, to the further space or room saving concept during storage of the freight loading device inside the aircraft.

BRIEF DESCRIPTION OF THE DRAWING

Further details of the inventive loading device result from the following description of the drawing. In the drawing, the invention is explained illustratively.

In the drawing.

DETAILED DESCRIPTION

Figures 1, 2:
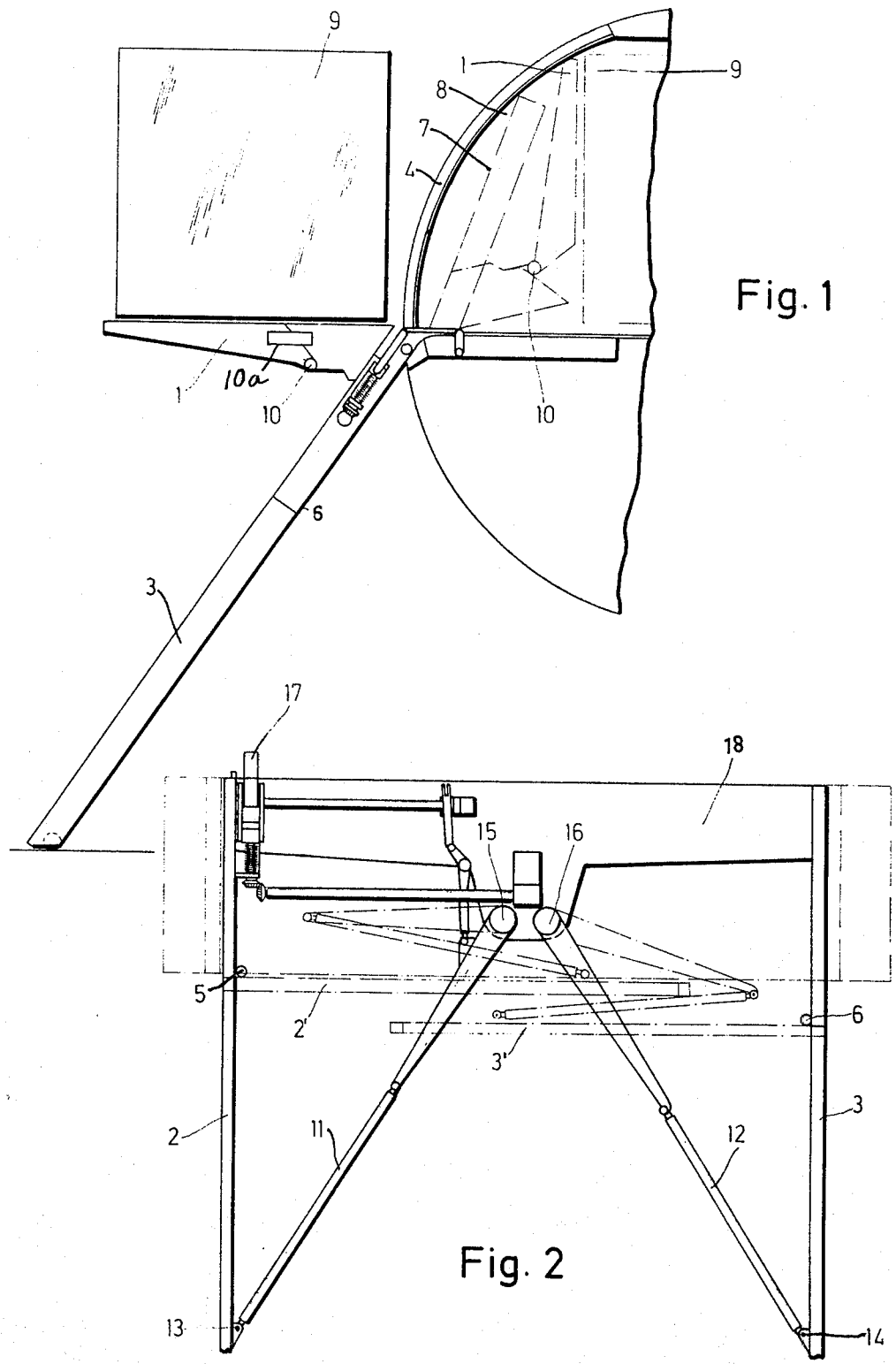
FIG. 1 is a side view of a freight loading device with a view into the freight compartment.
FIG. 2 is a front view of the device.

The frame which carries the platform 1 consists of two beams 2 and 3 which in their upper zone is hinged to the aircraft fuselage 4 and have each a further joint 5 and 6 intermediate the ends thereof. The central or rotary axes of these joints lie inventively, when the beams 2 and 3 are in the operating position, generally parallel to the z-axis, approximately parallel to the y-axis of the aircraft. This makes it possible for the beams 2 and 3 to swing in from their operating position into a position parallel to the x-axis of the aircraft against one another. This position of the beams 2,3 can be seen from FIG. 2 where the swung-in beams are shown in broken lines and provided with reference numerals 2',3'. If now the beams are swung from this position into the aircraft, then a stored position is obtained which has in FIG. 1 the reference numeral 7. The beams 2,3 remain in the position which is parallel to the x-axis of the aircraft when the beams are in the stored position 7. Thus, the beams 2,3 or 2',3' are, in the stored position, in a space 8 in the aircraft fuselage which is a dead space between the fuselage 4 and the loading goods 9, such as large sized load carrying containers. As can furthermore be seen from FIG. 1, aside from the beam package 7, the platform 1 can also be provided therein in the space 8. The platform has, in the illustration according to FIG. 1, an intermediate joint 10 which permits a space-saving folding thereof. A locking device 10A is associated with the platform to prevent it from folding during use.

As can furthermore be taken from FIG. 2, the beams 2 and 3 have each a foldable support bar 11 and 12. The support bars are hingedly connected as at the points 13 and 14 to the beams 2,3 adjacent the lower ends thereof and at the points 15 and 16 to an intermediate carrier 18 secured to the aircraft fuselage. Thus, the support bars are capable of fulfilling two tasks, namely to support the beams when in the operating position and to move them furthermore back and forth between the positions 2,2' and 3,3'. The latter is done by means of a drive system 17 which moves the beams through levers, joints and gears.

In order to make sure that the beams 2' and 3' will lie directly side-by-side, it is advantageous to arrange the hinged joints 5 and 6 suitable offset against one another in the vertical or z-direction. This measure can clearly be recognized in FIG. 2 in which the hinged joint 5 is arranged slightly higher than the hinged joint 6. Thus, the beams 2' and 3' lie in the rest position parallel to one another as this can be recognized by the broken line showing of the beams 2' and 3' in FIG. 2.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In an on-board freight loading device for aircraft, particularly for large aircraft, which transport large containers for containerized freight, said aircraft having mutually perpendicular $x$ and $y$ axes, said $x$-axis being parallel to the longitudinal axis of said aircraft and said $y$-axis being perpendicular to said $x$-axis in the direction of the wings of said aircraft, said aircraft also having a lifting platform for receiving said freight, said lifting platform being lifted approximately from the ground level to the level of the freight room floor of said aircraft, said platform being moved between a pair of beams which are swingable between a storage position within the aircraft fuselage and an operating position inclined to the vertical outside of said aircraft, the improvement comprising wherein said pair of beams are parallel to one another when in said operating position and are hingedly secured in their upper zone to said aircraft, each of said pair of beams having further hinged joint means intermediate the ends thereof for permitting a movement of the lower zone of said beams from the operating position first into a position parallel to the $x$-axis against one another prior to their being swung into said storage position, the axes of said further hinged joint means each being parallel and contained in a vertical plane parallel to said $y$-axis of said aircraft.

2. The improved on-board freight loading device according to claim 1, wherein said axes of said further hinged joint means, when in the operating position, are vertically spaced relative to one another to facilitate said movement of said lower zones into said parallel position.

3. The improved on-board freight loading device according to claim 1, wherein said lifting platform has an intermediate joint thereon and a locking device associated therewith.

4. The improved on-board freight loading device according to claim 1, including a pair of foldable support bars each extending from said aircraft between said beams down to a position adjacent the lower ends of separate ones of said beams in said lower zone.

5. The improved on-board freight loading device according to claim 4, including drive means for driving said foldable support bars to effect said movement of said lower zone of said beams from said operating position to a position parallel to said $x$-axis.

6. The improved on-board freight loading device according to claim 1, wherein said axes of said further hinged joint means, when in the operating position, are also inclined to said $y$-axis.

* * * * *